US011663783B2

(12) United States Patent
Goslin et al.

(10) Patent No.: US 11,663,783 B2
(45) Date of Patent: May 30, 2023

(54) SYSTEMS AND METHODS FOR USING AUGMENTED REALITY WITH THE INTERNET OF THINGS

(71) Applicant: Disney Enterprises, Inc., Burbank, CA (US)

(72) Inventors: Michael P. Goslin, Burbank, CA (US); Eric Haseltine, Burbank, CA (US); Joseph Olson, Burbank, CA (US); Timothy Panec, Burbank, CA (US); Katherine M. Bassett, Burbank, CA (US); Blade Olson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/429,953

(22) Filed: Feb. 10, 2017

(65) Prior Publication Data

US 2017/0228936 A1   Aug. 10, 2017

Related U.S. Application Data

(60) Provisional application No. 62/293,747, filed on Feb. 10, 2016.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G06F 3/013* (2013.01)

(58) Field of Classification Search
CPC ........... G06T 19/006; G06T 7/70; G06T 7/20; G06T 2207/30196; G06F 3/011; G06F 3/013
See application file for complete search history.

(56) References Cited

U.S. PATENT DOCUMENTS

| RE34,728 E | 9/1994 | Hall-Tipping |
| 6,152,856 A | 11/2000 | Studor |

(Continued)

FOREIGN PATENT DOCUMENTS

| CN | 109068161 | 12/2018 |

OTHER PUBLICATIONS

Dictionary.com, Defintion of lightsaber, 2019, Dictionary.com, pp. 1-2 (Year: 2019).

(Continued)

*Primary Examiner* — Tapas Mazumder
(74) *Attorney, Agent, or Firm* — Esplin & Associates, PC

(57) ABSTRACT

This disclosure relates to systems and methods for using augmented reality with the internet of things. An augmented reality experience may be provided based on an operation of an object. Operation status information of a detected object may be obtained and a visual effect may be determined based on the operation status information. An object may be controlled using augmented reality. Operation status information of a detected object may be obtained and a control option may be determined based on the operation status information. A visual effect may be determined based on the control option and a user input regarding the control option may be obtained. A control information configured to effectuate a change in the operation of the object may be transmitted to the object.

16 Claims, 7 Drawing Sheets

(56) References Cited

U.S. PATENT DOCUMENTS

| | | | |
|---|---|---|---|
| 6,162,123 A | 12/2000 | Woolston | |
| 6,817,979 B2 | 11/2004 | Nihtilae | |
| 7,128,693 B2 | 10/2006 | Brown | |
| 7,402,105 B1 | 7/2008 | Hutter | |
| 7,719,563 B2 | 5/2010 | Richards | |
| 7,765,111 B2 | 7/2010 | Brown | |
| 8,016,680 B1 | 9/2011 | Hutter | |
| 8,506,396 B1 | 8/2013 | Snyder | |
| 8,597,121 B2 | 12/2013 | Andres Del Valle | |
| 8,612,363 B2 | 12/2013 | Karkanias | |
| 9,101,837 B1 | 8/2015 | Snyder | |
| 9,364,746 B2 | 6/2016 | Chudley | |
| 9,931,539 B1 | 4/2018 | De Pablos | |
| 9,972,138 B2 | 5/2018 | Goslin | |
| 10,223,836 B2 | 3/2019 | Goslin | |
| 10,300,372 B2 | 5/2019 | Goslin | |
| 10,304,251 B2 | 5/2019 | Pahud | |
| 10,974,132 B2 | 4/2021 | Drake | |
| 2002/0024675 A1 | 2/2002 | Foxlin | |
| 2004/0002634 A1 | 1/2004 | Nihtila | |
| 2004/0077462 A1 | 4/2004 | Brown | |
| 2005/0101845 A1 | 5/2005 | Nihtila | |
| 2007/0126700 A1 | 6/2007 | Wright | |
| 2007/0252815 A1 | 11/2007 | Kuo | |
| 2008/0039206 A1 | 2/2008 | Ackley | |
| 2008/0146334 A1 | 6/2008 | Kil | |
| 2008/0274805 A1 | 11/2008 | Ganz | |
| 2009/0132728 A1* | 5/2009 | Fukui | H04N 21/4108 710/8 |
| 2009/0307611 A1 | 12/2009 | Riley | |
| 2009/0309891 A1 | 12/2009 | Karkanias | |
| 2009/0325701 A1 | 12/2009 | Andres Del Valle | |
| 2010/0261526 A1 | 10/2010 | Anderson | |
| 2011/0250962 A1 | 10/2011 | Feiner | |
| 2012/0050535 A1 | 3/2012 | Densham | |
| 2012/0254749 A1 | 10/2012 | Downs, III | |
| 2012/0262365 A1 | 10/2012 | Mallinson | |
| 2012/0327117 A1 | 12/2012 | Weller | |
| 2013/0042296 A1 | 2/2013 | Hastings | |
| 2013/0044128 A1 | 2/2013 | Liu | |
| 2013/0229396 A1 | 9/2013 | Huebner | |
| 2013/0286004 A1 | 10/2013 | Mcculloch | |
| 2014/0002329 A1 | 1/2014 | Nishimaki | |
| 2014/0003651 A1 | 1/2014 | Smoot | |
| 2014/0078517 A1 | 3/2014 | Ben-Yishai | |
| 2014/0080109 A1 | 3/2014 | Haseltine | |
| 2014/0104169 A1 | 4/2014 | Masselli | |
| 2014/0116469 A1 | 5/2014 | Kim | |
| 2014/0160117 A1* | 6/2014 | Nehmadi | G06F 3/0304 345/419 |
| 2015/0035677 A1 | 2/2015 | Williams | |
| 2015/0201188 A1 | 7/2015 | Pritch | |
| 2015/0243286 A1 | 8/2015 | Goslin | |
| 2015/0248785 A1 | 9/2015 | Holmquist | |
| 2016/0055677 A1 | 2/2016 | Kuffner | |
| 2016/0189411 A1 | 6/2016 | Matsunaga | |
| 2016/0206957 A1 | 7/2016 | Goslin | |
| 2016/0247324 A1* | 8/2016 | Mullins | G06F 3/012 |
| 2016/0253842 A1 | 9/2016 | Shapira | |
| 2016/0260261 A1 | 9/2016 | Hsu | |
| 2016/0274662 A1 | 9/2016 | Rimon | |
| 2016/0299563 A1 | 10/2016 | Stafford | |
| 2016/0327798 A1 | 11/2016 | Xiao | |
| 2016/0352930 A1* | 12/2016 | Fujita | H04N 1/00206 |
| 2017/0087465 A1 | 3/2017 | Lyons | |
| 2017/0124713 A1 | 5/2017 | Jurgenson | |
| 2017/0132841 A1 | 5/2017 | Morrison | |
| 2017/0161561 A1 | 6/2017 | Marty | |
| 2017/0185233 A1* | 6/2017 | Ono | G06F 3/0386 |
| 2017/0203225 A1 | 7/2017 | Goslin | |
| 2017/0213387 A1 | 7/2017 | Bean | |
| 2017/0257594 A1 | 9/2017 | Goslin | |
| 2017/0295229 A1 | 10/2017 | Shams | |
| 2018/0081439 A1 | 3/2018 | Daniels | |
| 2018/0173300 A1 | 6/2018 | Schwarz | |
| 2018/0190017 A1 | 7/2018 | Mendez | |
| 2018/0204362 A1 | 7/2018 | Tinsman | |
| 2018/0239144 A1 | 8/2018 | Woods | |
| 2018/0295324 A1 | 10/2018 | Clark | |
| 2018/0350056 A1 | 12/2018 | Cardenas Bernal | |
| 2018/0350118 A1 | 12/2018 | Bastaldo-Tsampalis | |
| 2018/0365893 A1 | 12/2018 | Mullins | |
| 2019/0019346 A1 | 1/2019 | Cuthbertson | |
| 2019/0243446 A1 | 8/2019 | Panec | |
| 2019/0329405 A1 | 10/2019 | Atohira | |
| 2020/0037144 A1 | 1/2020 | Chen | |
| 2021/0001171 A1 | 1/2021 | Fung | |

OTHER PUBLICATIONS

Virtual and Augmented Reality, Oct. 2016, Citi GPS: Global Perspectives & Solutions. (128 pages).

Hashimoto, Sunao, et al., "Touch Me: An Augmented Realtiy Based Remote Robot Manipulation", The 21st International Conference on Artificial Reality and Telexistence, Nov. 28-30, 2011, Osaka, Japan, The Virtual Relaity Society of Japan, pp. 61-66 (Year: 2011).

* cited by examiner

SYSTEMS AND METHODS FOR USING AUGMENTED REALITY WITH THE INTERNET OF THINGS

FIELD

This disclosure relates to systems and methods for providing augmented reality experience based on an operation of an object.

BACKGROUND

Internet of Things (IoT) devices may include devices that use the Internet (or other communication networks) to send and/or receive information to/from a remote device. IoT devices may send information relating to their operation over a communication network so that a remote device may observe the operation of the IoT devices. IoT devices may receive information relating to their operation over a communication network so that a remote device may control the operation of the IoT devices.

To check the operation of an object (e.g., toy, appliance, etc.), a user may need to look at a display on the object and/or use a controller for the object. Checking the operation of an object in such a manner may be inconvenient and time consuming.

SUMMARY

This disclosure relates to augmenting an appearance of an object. To provide an augmented reality experience based on an operation of an object, an object may be detected and a position and/or an orientation of the object may be determined. Operation status information may be obtained and a visual effect may be determined based on the operation status information. An overlay position and/or an overlay orientation for the visual effect may be determined and an overlay image including the visual effect may be determined. The overlay image may be displayed.

A system that tracks objects for augmented reality may include one or more of a display, a first image sensor, one or more physical processors, and/or other components. In some implementations, the first image sensor and/or the one or more processors may be carried on the display. The field of view of the first image sensor may be a function of the position and/or the orientation of the display, and/or other information. In some implementations, the system may include a second image sensor configured to track a position of one or more eyes of a user.

The display may be configured to display an overlay image and/or other information. The display may include one or more devices that may present information visually. In some implementations, the display may include one or more screens of one or more display devices. In some implementations, the display may include one or more display devices. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The first image sensor may be configured to generate visual output signals conveying visual information within a field of view of the first image sensor. The first image sensor may include one or more of a charge-coupled device sensor, an active pixel sensor, a complementary metal-oxide semiconductor sensor, an N-type metal-oxide-semiconductor sensor, and/or other image sensors.

The one or more physical processors may be configured by machine-readable instructions. Executing the machine-readable instructions may cause the one or more physical processors to facilitate providing augmented reality experience based on an operation of an object. The machine-readable instructions may include one or more computer program components. The computer program components may include one or more of an object detection component, an operation status component, a visual effects component, an overlay component, a display component, and/or other computer program components.

The object detection component may be configured to detect the object based on the visual output signals. In some implementations, the object may be detected further based on a gaze direction of an eye of a user. The object within the field of view of the first image sensor may be detected when the gaze direction of the eye of the user is pointed towards the object. Detection of the object may include identification of the object, including the identification of object type, object model, and/or other information relating to the object. The object detection component may be configured to determine a position and/or an orientation of the object based on the visual output signals.

The operation status component may be configured to obtain operation status information of the object and/or other information. Operation status information of the object may characterize the operation status of the object. Operation status component may obtain operation status information of the object by communicating with the object and/or another communication device (e.g., a server, a router, a network, etc.). In some implementations, the operation status component may be configured to determine one or more changes in the operation status information of the object. The change in the operation status information of the object may include transitional operation status information of the object.

The visual effects component may be configured to determine a first visual effect based on the operation status information and/or other information. A visual effect may refer to one or more information that may be observed visually. A visual effect may be static or dynamic, and may be visually observable at a time, over a period of time, at a location, or over a range of locations. In some implementations, the first visual effect may be determined further based on a recreational presentation conveyed to a user through one or more of visual, audio, and/or haptic simulation.

In some implementations, the visual effects component may be configured to determine the first visual effect further based on the change in the operation status information and/or other information. In some implementations, the visual effects component may be configured to determine a second visual effect based on the change in the operation status information and/or other information.

The visual effects component may be configured to determine an overlay position and/or an overlay orientation for the first visual effect based on the position and/or the orientation of the object and/or other information. In some implementations, the visual effects component may be configured to determine an overlay position and/or an overlay orientation for the second visual effect based on the position and/or the orientation of the object and/or other information.

The overlay component may be configured to determine the overlay image comprising the first visual effect and/or other information. The first visual effect may be placed within the overlay image according to the overlay position and/or the overlay orientation for the first visual effect and/or other information. In some implementations, the overlay component may be configured to add the second visual effect to the overlay image. The second visual effect may be placed within the overlay image according to the overlay position and/or the overlay orientation for the second visual effect. In some implementations, adding the second visual effect in the overlay image includes removing the first visual effect from the overlay image.

The display component may be configured to effectuate displaying of the overlay image on the display. In some implementations, the display component may be configured to effectuate displaying of the overlay image within one or more of an image, a video, and/or other visual information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
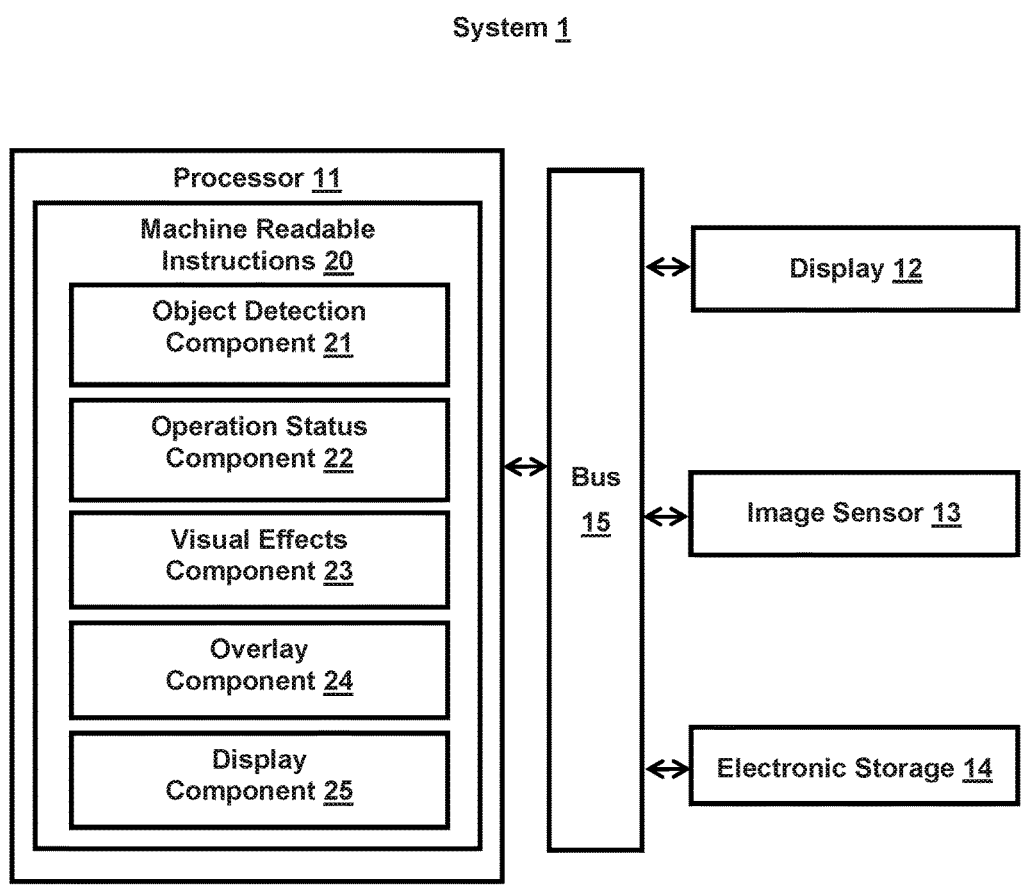
FIG. 1 illustrates a system for providing augmented reality experience based on an operation of an object.

FIG. 1 illustrates a system 1 for providing augmented reality experience based on an operation of an object. System 1 may include one or more of processor 11, display 12, image sensor 13, electronic storage 14, bus 15, and/or other components. To provide an augmented reality experience based on an operation of an object, an object may be detected and a position and/or an orientation of the object may be determined. Operation status information may be obtained and a visual effect may be determined based on the operation status information. An overlay position and/or an overlay orientation for the visual effect may be determined and an overlay image including the visual effect may be determined. The overlay image may be displayed.

Display 12 may be configured to display an overlay image. In some implementations, display 12 may include one or more of a head-mounted display, an optical head-mounted display, a see-through display, an optical see-through display, a video see-through display, a visor, eye-glasses, sunglasses, a smartphone, a tablet, a mobile device, a projector, and/or other displays. In some implementations, processor 11 and image sensor 13 may be carried on display 12, and the field of view of image sensor 13 may be a function of the position and the orientation of display 12.

Image sensor 13 may be configured to generate visual output signals conveying visual information within the field of view of image sensor 13. Visual information may include one or more of an image, a video, and/or other visual information. When an object is within the field of view of image sensor 13, visual information may include one or more of an image, a video, and/or other visual information regarding the object. Image sensor 13 may include one or more of a charge-coupled device sensor, an active pixel sensor, a complementary metal-oxide semiconductor sensor, an N-type metal-oxide-semiconductor sensor, and/or other image sensors.

Electronic storage 14 may include electronic storage media that electronically stores information. Electronic storage 14 may store software algorithms, information determined by processor 11, information received remotely, and/or other information that enables system 1 to function properly. For example, electronic storage 14 may store visual information (as discussed elsewhere herein), information relating to operation status information, information relating to objects, and/or other information.

Processor 11 may be configured to provide information processing capabilities in system 1. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 20 to facilitate providing augmented reality experience based on an operation of an object. Machine readable instructions 20 may include one or more of object detection component 21, operation status component 22, visual effects component 23, overlay component 24, display component 25, and/or other components.

Object detection component 21 may be configured to detect an object based on the visual output signals. Detection of the object may include identification of the object, including the identification of object type, object model, and/or other information relating to the object. In some implementations, identification of the object may include object detection component 21 effectuating communication with the object to facilitate the identification of the object. Communication may include wireless communication. By way of non-limiting example, wireless communication may include one or more of radio communication, Bluetooth communication, Wi-Fi communication, cellular communication, infrared communication, or other wireless communication.

Object detection component 21 may be configured to determine a position and/or an orientation of an object based on the visual output signals. In some implementations, object detection component 21 may be configured to determine a position and/or an orientation of an object based on visual markers. Visual marker may include things that facilitate determination of a position and/or an orientation of the objects. For example, visual markers may include one or more of a label, a sticker, an augmented reality marker, a landmark, a light source, a part of an object, an entire shape of an object, and/or other visual markers. Object detection component 21 may detect one or more visual makers and determine the position and/or the orientation of the object based on the position and/or the orientation of the visual marker(s). Object detection component 21 may include or retrieve information (for example, a database, etc.) that matches a detected visual marker to a position and/or an orientation of an object.

Figure 3:
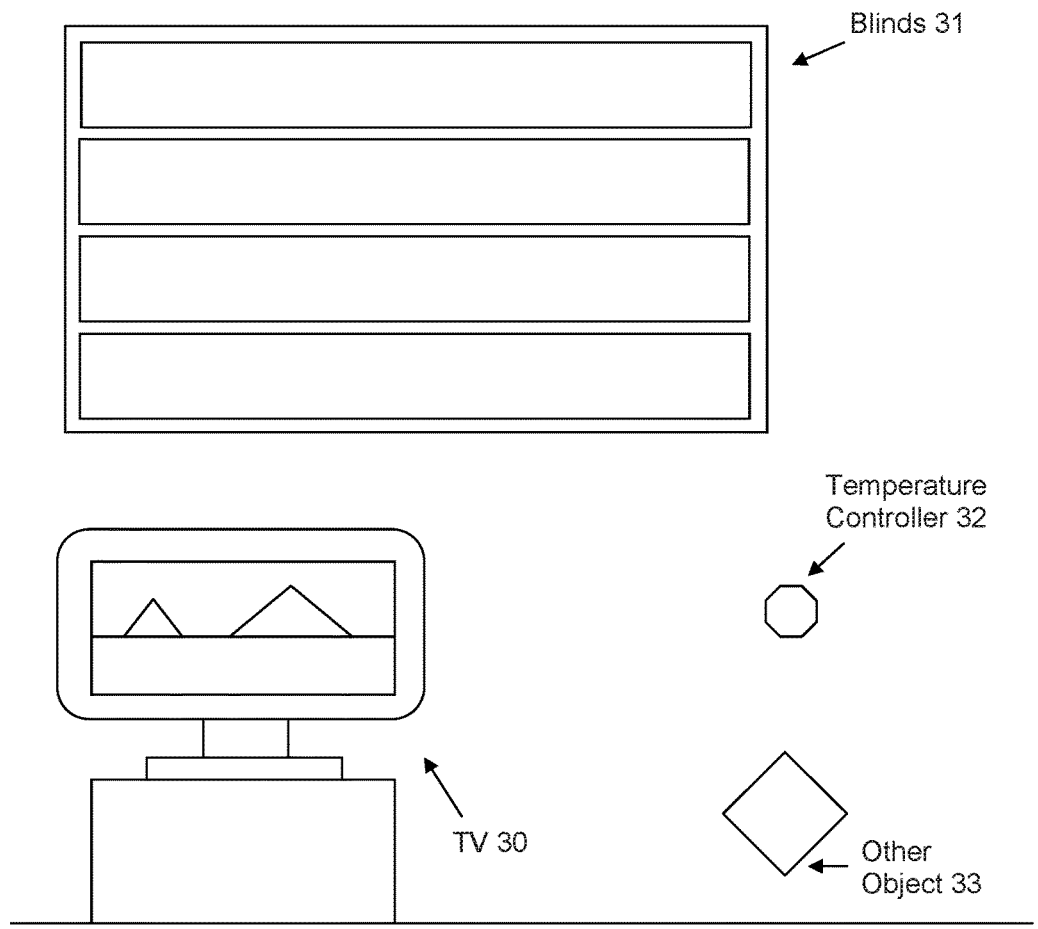
FIG. 3 illustrates an example of objects within a field of view of an image sensor.

For example, FIG. 3 illustrates an example of objects within a field of view of image sensor 13. Based on the visual output signals, object detection component 21 may detect TV 30, blinds 31, temperature controller 32, and/or other object 33. Based on the visual output signals, object detection component 21 may determine positions and/or orientations of TV 30, blinds 31, temperature controller 32, and/or other object 33. Other types of objects are contemplated.

In some implementations, object detection component 21 may be configured to detect an object based on the visual output signals and a gaze direction of an eye. System 1 may include a second image sensor configured to track the position of a user's eye(s). Based on the position of the user's eye(s) and the field of view of the user (the field of view of the user may be the same as or may be determined from the field of view of image sensor 13), object detection component 21 may determine the gaze direction of the user's eye(s). Object detection component 21 may be configured to detect an object within the field of view of image sensor 13 when the gaze direction of the user's eye(s) is pointed towards the object. For example, in FIG. 3, object detection component 21 may detect TV 30 when the gaze direction of the user's eye(s) is pointed towards TV 30. When the gaze direction of the user's eye(s) changes to point towards blinds 31, object detection component 21 may stop detecting TV 30 and start detecting blinds 31.

Operation status component 22 may be configured to obtain operation status information of the object. Operation status information of the object may characterize the operation status of the object. The operation status information of the object may characterize the operation status of the object at a time, over a period of time, at a location, or over a range of locations. For example, operating status information may include the power state of the object (e.g., on, off, operating in a power-saving mode, etc.), values of operating parameters that may be changed (e.g., channel and/or volume information for a TV, temperature information for a thermostat, etc.), values of operating parameters that may not be changed (e.g., power requirements, etc.) and/or other operation status information. Operation status component 22 may obtain operation status information of the object by communicating with the object or another communication device (e.g., a server, a router, a network, etc.). Operation status component 22 may obtain operation status information of the object using one or more wireless communication methods. By way of non-limiting example, wireless communication may include one or more of radio communication, Bluetooth communication, Wi-Fi communication, cellular communication, infrared communication, or other wireless communication. Other types of communications are contemplated.

For example, in FIG. 3, operation status component 22 may obtain operation status information of TV 30, blinds 31, temperature controller 32, and/or other object 33. Operation status component 22 may obtain operation status information of TV 30 indicating that TV 30 is on, and that TV 30 is set to a particular channel which is currently showing a particular content. Operation status component 22 may obtain operation status information of blinds 31 indicating that blinds 31 are closed. Operation status component 22 may obtain operation status information of temperature controller 32 indicating that temperature controller 32 is on and set to a particular target temperature, and that the current temperature around temperature controller 32. Operation status component 22 may obtain operation status information of other object 33 indicating certain operation status of object 33. Other types of operation status information are contemplated.

Visual effects component 23 may be configured to determine a visual effect based on the operation status information. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects. Visual effects component 23 may include or retrieve information (for example, a database, etc.) that matches an operation status information to a visual effect.

Figure 4:
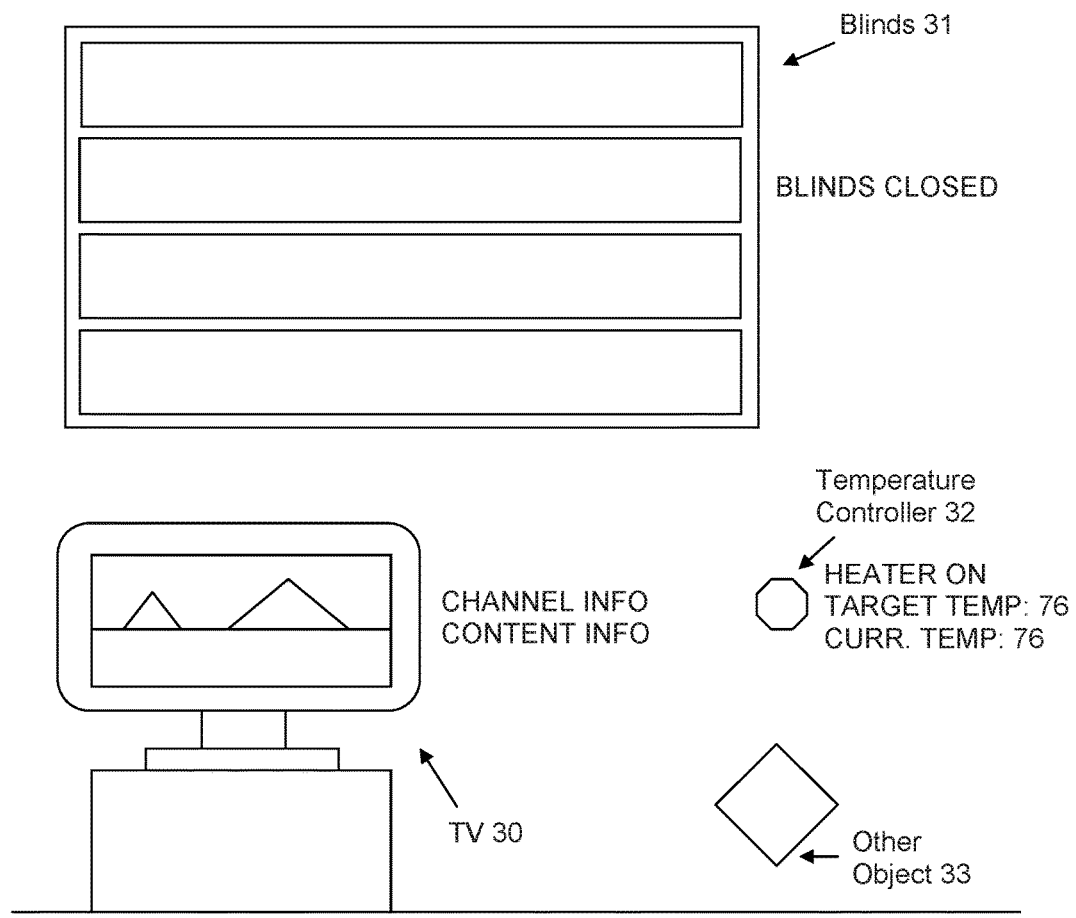
FIG. 4 illustrates an example of visual effects based on the operation status information of objects.

For example, FIG. 4 illustrates an example of visual effects based on the operation status information of objects. Based on the operation status information of TV 30 indicating that TV 30 is on, and that TV 30 is set to a particular channel which is currently showing a particular content, visual effects component 23 may determine a visual effect indicating the information regarding the channel and information regarding the content. Based on operation status information of blinds 31 indicating that blinds 31 are closed, visual effects component 23 may determine a visual effect indicating that blinds 31 are closed. Based on operation status information of temperature controller 32 indicating that temperature controller 32 is on and set to a particular target temperature, and the current temperature detected by temperature controller 32, visual effects component 23 may determine a visual effect indicating that the heater is on and information regarding the target temperature and the current temperature. Based on operation status information of other object 33 indicating certain operation status of object 33, visual effects component 23 may determine a visual indicating the certain operation status. Other types of visual effects are contemplated.

Figure 5:
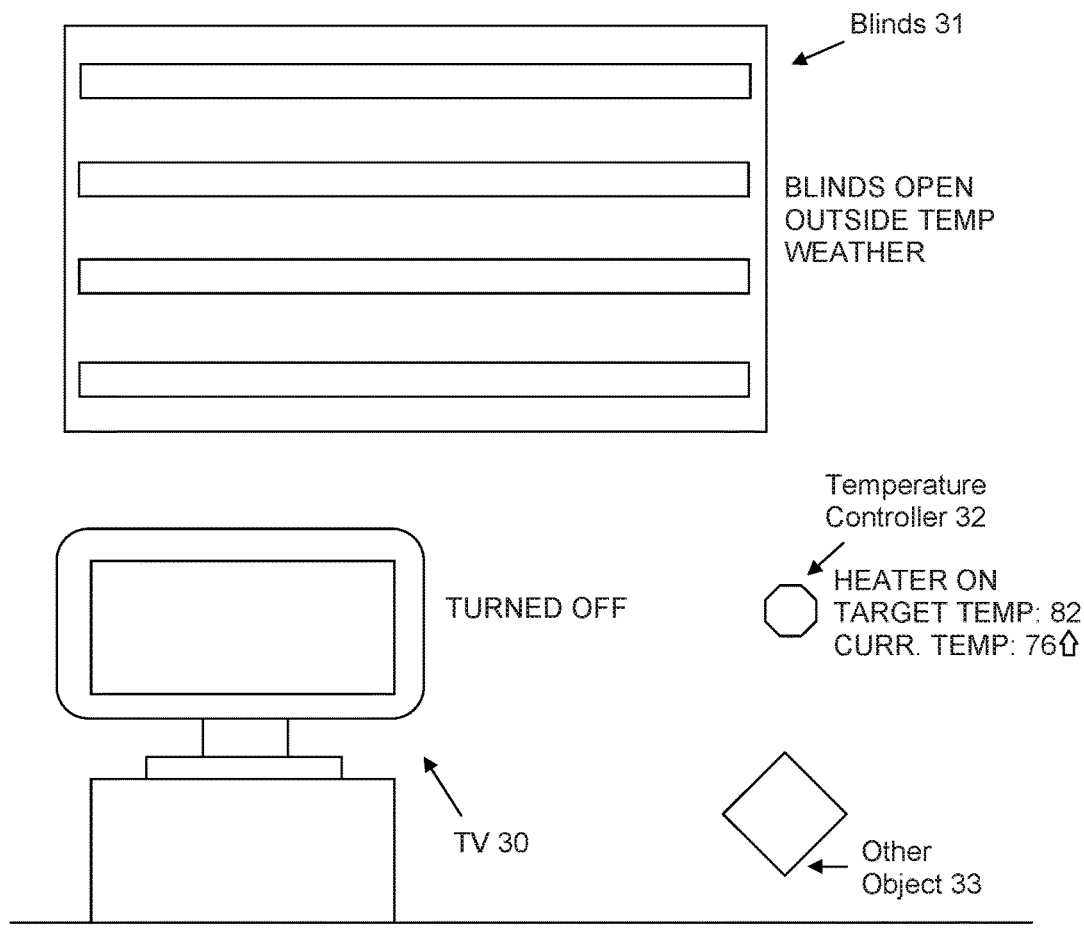
FIG. 5 illustrates an example of visual effects based on changes in the operation status information of objects.

In some implementations, operation status component 22 may be configured to determine a change in the operation status information of an object and visual effects component 23 may be configured to determine a visual effect based on the change in the operation status information. FIG. 5 illustrates an example of visual effects based on changes in the operation status information of objects. In FIG. 5, TV 30 has been turned off, blinds 31 have been opened, and the target temperature of temperature controller 32 has been raised. Operation status component 22 may determine a change in the operation status information of TV 30 indicating that TV 30 has been turned off. Operation status component 22 may determine a change in operation status information of blinds 31 indicating that blinds 31 have been opened. Operation status component 22 may determine a change in operation status information of temperature controller 32 indicating that the target temperature of temperature controller 32 has been changed. Operation status component 22 may determine a change in operation status information of other object 33 indicating that the certain operation status of object 33 has been changed. Other types of changes in operation status information are contemplated.

Based on the change in the operation status information of TV 30 indicating that TV 30 has been turned off, visual effects component 23 may determine a visual effect indicating that TV 30 is off. Based on the change in the operation status information of blinds 31 indicating that blinds 31 have been opened, visual effects component 23 may determine a visual effect indicating that blinds 31 are open. Based on the change in the operation status information of temperature controller 32 indicating that the target temperature of temperature controller 32 has been changed, visual effects component 23 may determine a visual effect indicating that the heater is on and information regarding the target temperature and the current temperature. Based on the change in the operation status information of other object 33 indicating that the certain operation status of object 33 has been changed, visual effects component 23 may determine a visual effect indicating the change in the certain operation status. Other types of visual effects are contemplated.

Change in the operation status information of object may also include transitional operation status information. For example, operation status component 22 may determine a change in the operation status information of TV 30 indicating that TV 30 is turning off, and visual effects component 23 may determine a visual effect indicating that TV 30 is turning off. Operation status component 22 may determine a change in operation status information of blinds 31 indicating that blinds 31 are opening, and visual effects component 23 may determine a visual effect indicating that blinds 31 are opening. Operation status component 22 may determine a change in operation status information of temperature controller 32 indicating that the target temperature of temperature controller 32 is changing and visual effects component 23 may determine a visual effect indicating that the target temperature of temperature controller 32 is changing. Other types of change in the operation status information of object are contemplated.

In some implementations, a visual effect may include the operation status information of the object or the change in the operation status information of the object. In some implementations, a visual effect may include information relating to the operation status information of the object or the change in the operation status information of the object. For example, in FIG. 5, operation status information of blinds 31 may indicate that blinds 31 are open. Visual effects component 23 may determine a visual effect indicating that blinds 31 are open and other information relating to the opened blinds 31, such as information relating to the outside temperature, the weather, and/or other information. Other information relating to the operation status information of the object or the change in the operation status information of the object are contemplated.

In some implementations, visual effects component 23 may be configured to determine a visual effect based on the operation status information, the change in the operation status information, and/or information regarding a virtual experience. A virtual experience may refer to a recreational presentation conveyed to a user through one or more of visual, audio, haptic and/or other simulation. A recreational presentation may include one or more of a story, an image, a video, a movie, an audio, a song, a game, and/or other recreational presentations.

For example, a user of system 1 may be playing a video game (e.g., using a mobile platform, a console platform, a computer platform, a virtual reality platform, and/or an augmented reality platform) in which the user's game character is located in a snowing setting. Based on the change in the operation status information of blinds 31 indicating that blinds 31 have been opened and information regarding the virtual experience in the snowing setting, visual effects component 23 may determine a visual effect including snow falling in through the open blinds 31. Other types of visual effect based on the operation status information, the change in the operation status information, and/or information regarding a virtual experience are contemplated.

In some implementations, visual effects component 23 may be configured to determine a first visual effect based on the operation status information of an object and determine a second visual effect based on the change in the operation status information of the object. For example, as shown in FIG. 4, based on the operation status information of TV 30 indicating that TV 30 is on, and that TV 30 is set to a particular channel which is currently showing a particular content, visual effects component 23 may determine a first visual effect indicating the information regarding the channel and information regarding the content. Based on the change in the operation status information of TV 30 indicating that TV 30 has been turned off, visual effects component 23 may determine a second visual effect indicating that TV 30 is off. In some implementations, the second visual effect may replace the first visual effect. Other types of first visual effect and second visual effect are contemplated.

Visual effects component 23 may be configured to determine an overlay portion and/or an overlay orientation for a visual effect based on the position and/or the orientation of the object. Position and orientation component 21 may include or retrieve information (for example, a database, etc.) that matches an object to an overlay position and/or an overlay orientation for a visual effect. Position and orientation component 21 may determine an overlay position and/or an overlay orientation for a visual effect based on a certain distance from an object and/or a certain orientation with respect to an object. For example, position and orientation component 21 may determine an overlay position of a visual effect to be a certain distance in front of, behind, above, below, to the right, and/or to the left of the object. Position and orientation component 21 may determine an overlay orientation for a visual effect to be at a certain orientation with respect to the object.

Overlay component 24 may be configured to determine an overlay image. The overlay image may include a visual effect determined by visual effects component 23. The visual effect may be placed within the overlay image according to the overlay position and/or the overlay orientation for the visual effect. The overlay position and/or the overlay orientation for the visual effect may change how the visual effect appears within the overlay image. For example, the overlay position and/or the overlay orientation for the visual effect may change one or more of the position, the size, the shape, the tilt, the rotation, and/or other appearances of the visual effect. In some implementations, overlay component 24 may determine an overlay image including a first visual effect and a second visual effect. The first visual effect may be placed within the overlay image according to the overlay position and/or the overlay orientation for the first visual effect, and the second visual effect may be placed within the overlay image according to the overlay position and/or the overlay orientation for second visual effect. In some implementations, overlay component 24 may remove the first visual effect from the overlay image before adding the second visual effect.

Display component 25 may be configured to effectuate displaying of an overlay image on display 12. In some implementations, display component 25 may be configured to effectuate displaying of an overlay image within one or more of an image, a video, and/or other visual information based on the visual output signals generated by image sensor 13.

In some implementations, display component 25 may be configured to effectuate displaying of an overlay image on display 12, which allows light to be passed through display 12 in portions in which the overlay image does not contain the visual effect. For example, display 12 may include one or more of an optical head-mounted display and a user of display 12 may see light from the real world as well as the overlay image. In some implementations, display component 25 may be configured to change the transparency of one or more portions of display 12. For example, display component 25 may change the transparency of one or more portions of display 12 corresponding to the visual effect to block light from the real world passing through display 12.

Figure 2:
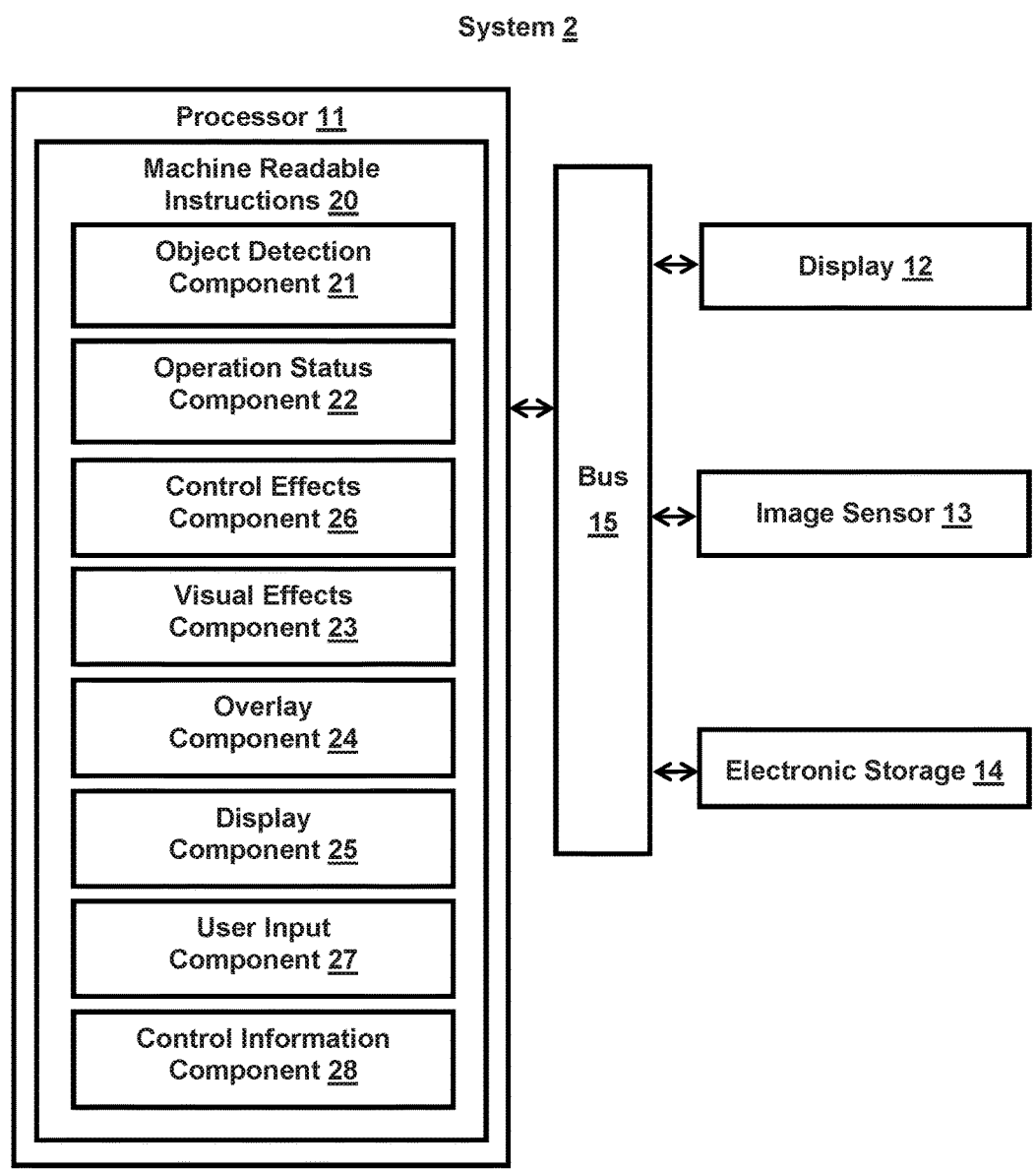
FIG. 2 illustrates a system for controlling an object using augmented reality.

FIG. 2 illustrates a system 2 for controlling an object using augmented reality. System 2 may include one or more of processor 11, display 12, image sensor 13, electronic storage 14, bus 15, and/or other components. To control an object using augmented reality, an object may be detected and a position and/or an orientation of the object may be determined. Operation status information may be obtained and a control option for the object may be determined based on the operation status information. A visual effect may be determined based the control option. An overlay position and/or an overlay orientation for the visual effect may be determined and an overlay image including the visual effect may be determined. The overlay image may be displayed. A user input regarding the control option may be obtained and a control information may be transmitted to the object. The control information may be configured to effectuate a change in the operation of the object.

Display 12, image sensor 13, and electronic storage 14 in FIG. 2 may operate in system 2 as described above with respect with system 1. Processor 11 in FIG. 2 may be configured to execute one or more machine readable instructions 20 to facilitate controlling an object using augmented reality. Machine readable instructions 20 may include one or more of object detection component 21, operation status component 22, visual effects component 23, overlay component 24, display component 25, control effects component 26, user input component 27, control information component 28, and/or other components.

Object detection component 21 may be configured to detect an object based on the visual output signals. Detection of the object may include identification of the object, including the identification of object type, object model, and/or other information relating to the object. In some implementations, identification of the object may include object detection component 21 effectuating communication with the object to facilitate the identification of the object. Communication may include wireless communication. By way of non-limiting example, wireless communication may include one or more of radio communication, Bluetooth communication, Wi-Fi communication, cellular communication, infrared communication, or other wireless communication. For example, FIG. 3 illustrates an example of objects within a field of view of image sensor 13. Based on the visual output signals, object detection component 21 may detect TV 30, blinds 31, temperature controller 32, and/or other object 33. Other types of objects are contemplated.

In some implementations, object detection component 21 may be configured to detect an object based on the visual output signals and a gaze direction of an eye. System 2 may include a second image sensor configured to track the position of a user's eye(s). Based on the position of the user's eye(s) and the field of view of the user (the field of view of the user may be the same as or may be determined from the field of view of image sensor 13), object detection component 21 may determine the gaze direction of the user's eye(s). Object detection component 21 may be configured to detect an object within the field of view of image sensor 13 when the gaze direction of the user's eye(s) is pointed towards the object. For example, in FIG. 3, object detection component 21 may detect TV 30 when the gaze direction of the user's eye(s) is pointed towards TV 30. When the gaze direction of the user's eye(s) changes to point towards blinds 31, object detection component 21 may stop detecting TV 30 and start detecting blinds 31.

Object detection component 21 may be configured to determine a position and/or an orientation of an object based on the visual output signals. In some implementations, object detection component 21 may be configured to determine a position and/or an orientation of an object based on visual markers. Visual marker may include things that facilitate determination of a position and/or an orientation of the objects. For example, visual markers may include one or more of a label, a sticker, an augmented reality marker, a landmark, a light source, a part of an object, an entire shape of an object, and/or other visual markers. Object detection component 21 may detect one or more visual makers and determine the position and/or the orientation of the object based on the position and/or the orientation of the visual marker(s). Object detection component 21 may include or retrieve information (for example, a database, etc.) that matches a detected visual marker to a position and/or an orientation of an object.

Operation status component 22 may be configured to obtain operation status information of the object. Operation status information of the object may characterize the operation status of the object. The operation status information of the object may characterize the operation status of the object at a time, over a period of time, at a location, or over a range of locations. For example, operating status information may include the power state of the object (e.g., on, off, operating in a power-saving mode, etc.), values of operating parameters that may be changed (e.g., channel and/or volume information for a TV, temperature information for a thermostat, etc.), values of operating parameters that may not be changed (e.g., power requirements, etc.) and/or other operation status information. Operation status component 22 may obtain operation status information of the object by communicating with the object or another communication device (e.g., a server, a router, a network, etc.). Operation status component 22 may obtain operation status information of the object using one or more wireless communication methods. By way of non-limiting example, wireless communication may include one or more of radio communication, Bluetooth communication, Wi-Fi communication, cellular communication, infrared communication, or other wireless communication. Other types of communications are contemplated.

For example, in FIG. 3, operation status component 22 may obtain operation status information of TV 30, blinds 31, temperature controller 32, and/or other object 33. Operation status component 22 may obtain operation status information of TV 30 indicating that TV 30 is on and set to a certain volume, and that TV 30 is set to a particular channel which is currently showing a particular content. Operation status component 22 may obtain operation status information of blinds 31 indicating that blinds 31 are closed. Operation status component 22 may obtain operation status information of temperature controller 32 indicating that temperature controller 32 is on and set to a particular target temperature. Operation status component 22 may obtain operation status information of other object 33 indicating certain operation status of object 33. Other types of operation status information are contemplated.

Control effects component 26 may be configured to obtain a control option for the object based on the operation status information. Control effects component 26 may include or retrieve information (for example, a database, etc.) that matches an operation status information to a control option. The control option may include an instruction set to change the operation of the object. In some implementations, the instruction set may include different instructions to change the operation of the object.

Visual effects component 23 may be configured to determine a visual effect based on the control option. A visual effect may indicate the control option. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects. Visual effects component 23 may include or retrieve information (for example, a database, etc.) that matches a control option to a visual effect.

Figure 6:
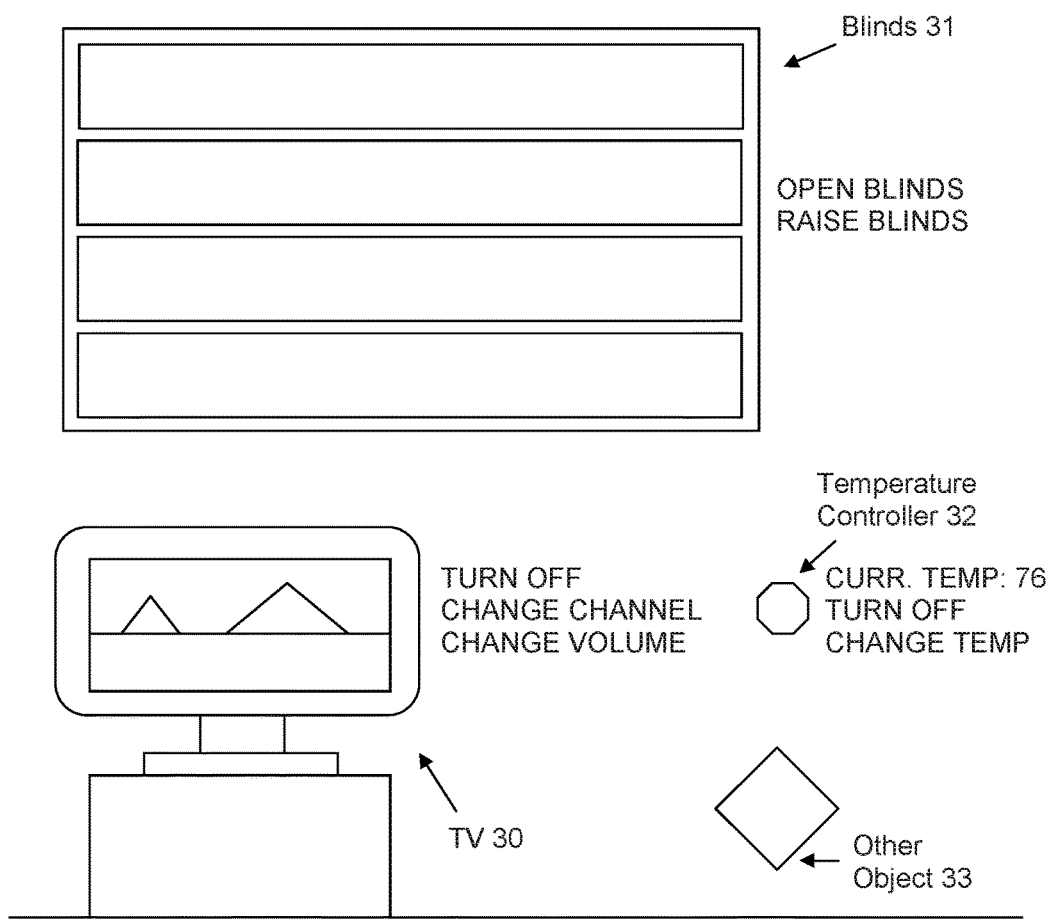
FIG. 6 illustrates an example of visual effects based on control options for objects.

For example, FIG. 6 illustrates an example of visual effects based on the control options of objects. Based on the operation status information of TV 30 indicating that TV 30 is on and set to a certain volume, and that TV 30 is set to a particular channel, visual effects component 23 may determine a visual effect indicating control options to turn off TV 30, change the channel of TV 30, and/or change the volume of TV 30. Based on operation status information of blinds 31 indicating that blinds 31 are closed, visual effects component 23 may determine a visual effect indicating control options to open blinds 31 or raise blinds 31. Based on operation status information of temperature controller 32 indicating that temperature controller 32 is on and set to a particular target temperature, visual effects component 23 may determine a visual effect indicating control options to turn off temperature controller 32 and/or change the target temperature. Based on operation status information of other object 33 indicating certain operation status of object 33, visual effects component 23 may determine a visual indicating control options for object 33. Other types of control options and visual effects are contemplated.

Visual effects component 23 may be configured to determine an overlay portion and/or an overlay orientation for a visual effect based on the position and/or the orientation of the object. Position and orientation component 21 may include or retrieve information (for example, a database, etc.) that matches an object to an overlay position and/or an overlay orientation for a visual effect. Position and orientation component 21 may determine an overlay position and/or an overlay orientation for a visual effect based on a certain distance from an object and/or a certain orientation with respect to an object. For example, position and orientation component 21 may determine an overlay position of a visual effect to be a certain distance in front of, behind, above, below, to the right, and/or to the left of the object. Position and orientation component 21 may determine an overlay orientation for a visual effect to be at a certain orientation with respect to the object.

Overlay component 24 may be configured to determine an overlay image. The overlay image may include a visual effect determined by visual effects component 23. The visual effect may be placed within the overlay image according to the overlay position and/or the overlay orientation for the visual effect. The overlay position and/or the overlay orientation for the visual effect may change how the visual effect appears within the overlay image. For example, the overlay position and/or the overlay orientation for the visual effect may change one or more of the position, the size, the shape, the tilt, the rotation, and/or other appearances of the visual effect.

Display component 25 may be configured to effectuate displaying of an overlay image on display 12. In some implementations, display component 25 may be configured to effectuate displaying of an overlay image within one or more of an image, a video, and/or other visual information based on the visual output signals generated by image sensor 13.

In some implementations, display component 25 may be configured to effectuate displaying of an overlay image on display 12, which allows light to be passed through display 12 in portions in which the overlay image does not contain the visual effect. For example, display 12 may include one or more of an optical head-mounted display and a user of display 12 may see light from the real world as well as the overlay image. In some implementations, display component 25 may be configured to change the transparency of one or more portions of display 12. For example, display component 25 may change the transparency of one or more portions of display 12 corresponding to the visual effect to block light from the real world passing through display 12.

User input component 27 may be configured to obtain a user input regarding the control option. User input may be received through one or more input devices. An input device may refer to a device that allows a user to input information. For example, an input device may include a key entry device, a touch entry device, an imaging device, a sound device, and/or other input devices. User input may refer to one or more information provided by a user through an input device.

A key entry device may include a device that allows a user to provide one or more user input by typing one or more of characters, numbers, and/or other symbols. A key entry device may include a separate device or a part of another device. For example, a key entry device may include a keyboard/button coupled to processor 11. As another example, a key entry device may include a mobile device coupled to processor 11. A user may provide one or more user input by typing one or more information. For example, a user may provide one or more user input by typing one or more of information relating to the control option.

A touch entry device may include a device that allows a user to provide user input by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user input by touching one or more portions of the touch entry device corresponding to one or more information. For example, a user may provide one or more user input by touching one or more portions of the touch entry device corresponding to one or more of information relating to the control option.

An imaging device may include a device that allows a user to provide user input by using an image sensor of the imaging device. An imaging device may include a separate device or a part of another device. For example, an imaging device may include an image sensor coupled to processor 11. As a non-limiting example, an imaging device may include image sensor 13. As another example, an imaging device may include a mobile device coupled to processor 11. A user may provide one or more user input by directing the field of view of the imaging device to objects that include information. For example, a user may provide one or more user input by directing the field of view of the imaging device to a landmark, an augmented reality marker, and/or other objects that include one or more of information relating to the control option.

A sound device may include a device that allows a user to provide user input through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user input by speaking one or more of information relating to the control option.

In some implementations, user input may be received through an interaction of a user with the visual effect. A user may interact with the visual effect directly or indirectly. For example, a user may interact with a visual effect by touching the visual effect, swiping the visual effect, grabbing the visual effect, expanding the visual effect, shrinking the visual effect, poking the visual effect, pointing to the visual effect while inputting another user input (e.g., point to a visual effect while vocally stating "activate," etc.), and/or other interactions. A user may interact with the visual effect through a part of the user's body part (e.g., finger, hand, etc.) or through another device (e.g., wand, glove, etc.).

Control information component 28 may be configured to effectuate transmission of control information to the object based on the user input. The control information may be configured to effectuate a change in the operation of the object according to the instruction set in the control option. The control information may be transmitted to the object directly or indirectly. For example, the control information may be directly transmitted to the object, or the control information may be indirectly transmitted to the object through another communication device (e.g., a server, a network, a router, etc.).

Although processor 11, display 12, image sensor 13, and electronic storage 14 are shown to be connected to a bus 15 in FIGS. 1 and 2, any communication medium may be used to facilitate interaction between any components of system 1 and between any components of system 2. One or more components of system 1 may communicate with each other through hard-wired communication, wireless communication, or both, and one or more components of system 2 may communicate with each other through hard-wired communication, wireless communication, or both. For example, processor 11 may wirelessly communicate with electronic storage 14. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIGS. 1 and 2 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 (as shown in FIG. 1) may be configured to execute one or more of object detection component 21, operation status component 22, visual effects component 23, overlay component 24, display component 25, and/or other components by software; hardware; firmware; some combination of software, hardware, and/or firmware; and/or other mechanisms for configuring processing capabilities on processor 11. Processor 11 (as shown in FIG. 2) may be configured to execute one or more of object detection component 21, operation status component 22, visual effects component 23, overlay component 24, display component 25, control effects component 26, user input component 27, control information component 28, and/or other components by software; hardware; firmware; some combination of software, hardware, and/or firmware; and/or other mechanisms for configuring processing capabilities on processor 11.

It should be appreciated that although components 21-25 and components 21-28 are illustrated in FIGS. 1 and 2 as being co-located within a single processing unit, in implementations in which processor 11 comprises multiple processing units, one or more of components 21-25 and components 21-28 may be located remotely from the other computer program components.

The description of the functionality provided by the different computer program components 21, 22, 23, 24, 25, 26, 27 and/or 28 described herein is for illustrative purposes, and is not intended to be limiting, as any of computer program components 20, 21, 22, 23, 24, 25, 26, 27, and/or 28 may provide more or less functionality than is described. For example, one or more of computer program components 20, 21, 22, 23, 24, 25, 26, 27, and/or 28 may be eliminated, and some or all of its functionality may be provided by other computer program components 20, 21, 22, 23, 24, 25, 26, 27, and/or 28. As another example, processor 11 may be configured to execute one or more additional computer program components that may perform some or all of the functionality attributed to one or more of computer program components 20, 21, 22, 23, 24, 25, 26, 27, and/or 28.

Although display 12 is depicted in FIGS. 1 and 2 as a single element, this is not intended to be limiting. Display 12 may include one or more displays in one or more locations.

Although image sensor 13 is depicted in FIGS. 1 and 2 as a single element, this is not intended to be limiting. Image sensor 13 may include one or more image sensors in one or more locations.

The electronic storage media of electronic storage 14 may be provided integrally (i.e., substantially non-removable) with one or more components of system 1 or system 2 and/or removable storage that is connectable to one or more components of system 1 or system 2 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 1 or system 2, or electronic storage 14 may be provided integrally with one or more other components of system 1 or system 2 (e.g., processor 11). Although electronic storage 14 is shown in FIGS. 1 and 2 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 7:
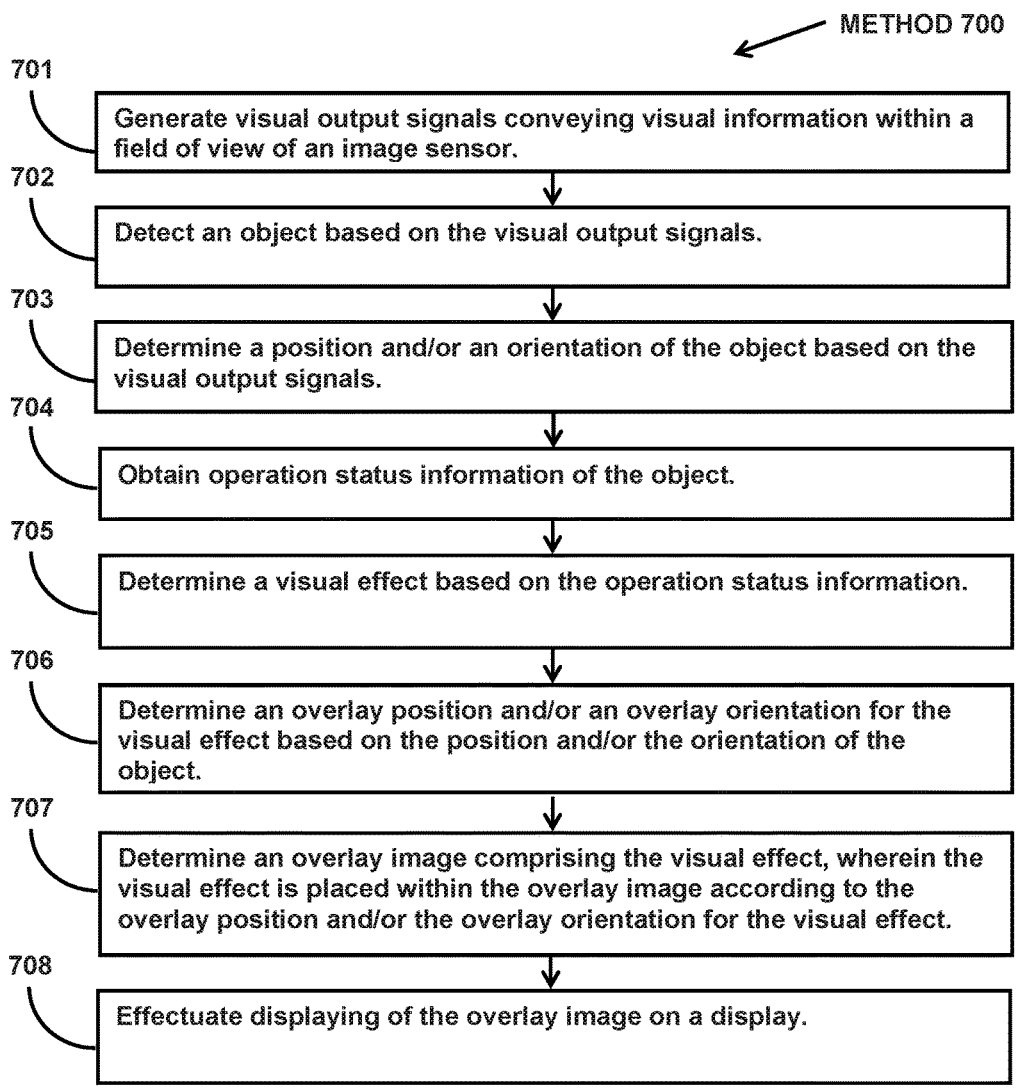
FIG. 7 illustrates a method for providing augmented reality experience based on an operation of an object.

FIG. 7 illustrates method 700 for augmenting an appearance of an object. The operations of method 700 presented below are intended to be illustrative. In some implementations, method 700 may be accomplished with one or more additional operations not described, and/or without one or more of the operations discussed. In some implementations, two or more of the operations may occur substantially simultaneously.

In some implementations, method 700 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 700 in response to instructions stored electronically on one or more electronic storage mediums. The one or more processing devices may include one or more devices configured through hardware, firmware, and/or software to be specifically designed for execution of one or more of the operations of method 700.

Referring to FIG. 7 and method 700, at operation 701, visual output signals conveying visual information within a field of view of an image sensor may be generated. Visual information may include one or more of an image, a video, and/or other visual information. In some implementations, operation 701 may be performed by one or more sensors the same as or similar to image sensor 13 (shown in FIG. 1 and described herein).

At operation 702, an object may be detected based on the visual output signals. In some implementations, operation 702 may be performed by a processor component the same as or similar to position and object detection component 21 (shown in FIG. 1 and described herein).

At operation 703, a position and/or an orientation of the object may be determined based on the visual output signals. In some implementations, operation 703 may be performed by a processor component the same as or similar to object detection component 21 (shown in FIG. 1 and described herein).

At operation 704, operation status information of the object may be obtained. In some implementations, operation 704 may be performed by a processor component the same as or similar to operation status component 22 (shown in FIG. 1 and described herein).

At operation 705, a visual effect may be determined based on the operation status information. In some implementations, operation 705 may be performed by a processor component the same as or similar to visual effects component 23 (shown in FIG. 1 and described herein).

At operation 706, an overlay position and/or an overlay orientation for the visual effect may be determined based on the position and/or the orientation of the object. In some implementations, operation 706 may be performed by a processor component the same as or similar to visual effects component 23 (shown in FIG. 1 and described herein).

At operation 707, an overlay image comprising the visual effect may be determined. The visual effect may be placed within the overlay image according to the overlay position and/or the overlay orientation for the visual effect. In some implementations, operation 707 may be performed by a processor component the same as or similar to overlay component 24 (shown in FIG. 1 and described herein).

At operation 708, displaying of the overlay image on a display may be. In some implementations, operation 708 may be performed by a processor component the same as or similar to display component 25 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system to control operation of an object through an augmented reality experience, the system comprising:
   an augmented reality display;
   an image sensor configured to generate output signals conveying visual information within a field of view of the image sensor; and
   one or more processors are configured by machine-readable instructions to:
   detect, based on the output signals, an object present within a real-world environment;
   establish wireless communication between the one or more processors and the object;
   obtain, from the object via the wireless communication, operation status information characterizing status of a current operation of the object;
   determine a control option for the object based on the operation status information, wherein the control option is associated with effectuating a change in the current operation of the object conveyed by the operation status information;
   generate an overlay image comprising a visual effect, the visual effect indicating the control option;
   effectuate displaying of the overlay image including the visual effect on the augmented reality display;
   detect, based on the output signals, a landmark within the field of view of the image sensor;
   determine, based on detection of the landmark within the field of view of the image sensor, that a user is performing an action of directing the field of view of the image sensor to the landmark;
   detect, based on performance of the action of directing the field of view of the image sensor to the landmark and the landmark being related to the control option, user input by the user conveying selection of the control option;
   responsive to detecting the user input, generate control information including instructions to effectuate the change in the current operation of the object; and
   effectuate transmission, from the one or more processors to the object via the wireless communication, of the control information so that the object effectuates the change in the current operation of the object.

2. The system of claim 1, wherein the one or more processors are further configured by the machine-readable instructions to detect, based on the output signals, an other action performed by the user in the real-world environment via a part of the user's body.

3. The system of claim 2, wherein the other action performed by the user represents an interaction with the visual effect, the interaction including one or more of touching the visual effect, swiping the visual effect, grabbing the visual effect, expanding the visual effect, shrinking the visual effect, poking the visual effect, or pointing to the visual effect.

4. The system of claim 1, wherein the one or more processors are further configured by the machine-readable instructions to:
   generate the overlay image to further comprise a second visual effect, the second visual effect displaying the status of the current operation of the object characterized by the operation status information.

5. The system of claim 4, wherein the one or more processors are further configured by the machine-readable instructions to:
   determine that the object has effectuated the change in the current operation, such that the status of the current operation of the object has been updated to an updated status reflecting the change; and
   update the second visual effect such that the second visual effect displays the updated status.

6. The system of claim 1, wherein the control option is determined from a set of available control options based on the operation status information.

7. The system of claim 1, wherein the current operation of the object is associated with a power state of the object, such that the control option is associated with effectuating a power-off state of the object, a power-on state of the object, or a power-saving state of the object.

8. The system of claim 1, wherein the current operation of the object is a changeable operation associated with a set of available operating states, such that the control option is associated with effectuating the change from the current operation to one of the available operating states in the set of the available operating states.

9. A method to control operation of an object through an augmented reality experience, the method comprising:
   generating an output signal conveying visual information within a field of view of an image sensor; and
   detecting, based on the output signal, an object present within a real-world environment;
   establishing wireless communication between the one or more processors and the object;
   obtaining, from the object via the wireless communication, operation status information characterizing status of a current operation of the object;
   determining a control option for the object based on the operation status information, wherein the control option is associated with effectuating a change in the current operation of the object conveyed by the operation status information;
   generating an overlay image comprising a visual effect, the visual effect indicating the control option;
   effectuating displaying of the overlay image including the visual effect on an augmented reality display;
   detecting, based on the output signals, a landmark within the field of view of the image sensor;
   determining, based on detection of the landmark within the field of view of the image sensor, that a user is performing an action of directing the field of view of the image sensor to the landmark;
   detecting, based on performance of the action of directing the field of view of the image sensor to the landmark and the landmark being related to the control option, user input by the user conveying selection of the control option;
   responsive to the detecting the user input, generating control information including instructions to effectuate the change in the current operation of the object; and
   effectuating transmission, from the one or more processors to the object via the wireless communication, of the control information so that the object effectuates the change in the current operation of the object.

10. The method of claim 9, wherein further comprising detecting, based on the output signals, an other action performed by the user in the real-world environment via a part of the user's body.

11. The method of claim 10, wherein the other action performed by the user represents an interaction with the visual effect the interaction including one or more of touching the visual effect, swiping the visual effect, grabbing the visual effect, expanding the visual effect, shrinking the visual effect, poking the visual effect, or pointing to the visual effect.

12. The method of claim 9, further comprising:
   generating the overlay image to further comprise a second visual effect, the second visual effect displaying the status of the current operation of the object characterized by the operation status information.

13. The method of claim 12, further comprising:
   determining that the object has effectuated the change in the current operation, such that the status of the current operation of the object has been updated to an updated status reflecting the change; and
   updating the second visual effect such that the second visual effect displays the updated status.

14. The method of claim 9, wherein the control option is determined from a set of available control options based on the operation status information.

15. The method of claim 9, wherein the current operation of the object is associated with a power state of the object, such that the control option is associated with effectuating a power-off state of the object, a power-on state of the object, or a power-saving state of the object.

16. The method of claim 9, wherein the current operation of the object is a changeable operation associated with a set of available operating states, such that the control option is associated with effectuating the change from the current operation to one of the available operating states in the set of the available operating states.

* * * * *